US011951875B2

(12) United States Patent
Langridge et al.

(10) Patent No.: US 11,951,875 B2
(45) Date of Patent: Apr. 9, 2024

(54) MULTI-SENSOR LIFE DETECTION WITHIN VEHICLES

(71) Applicant: International Business Machines Corporation, Armonk, NY (US)

(72) Inventors: Konstadin Langridge, Uxbridge (CA); Jenna Lau Caruso, Holland Landing (CA); Kevin Doyle, Whitby (CA); Lior Aronovich, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 17/070,067

(22) Filed: Oct. 14, 2020

(65) Prior Publication Data

US 2022/0111764 A1 Apr. 14, 2022

(51) Int. Cl.
*B60N 2/00* (2006.01)
*B60R 21/01* (2006.01)
*G06V 20/59* (2022.01)

(52) U.S. Cl.
CPC .......... *B60N 2/002* (2013.01); *G06V 20/597* (2022.01); *B60R 21/01* (2013.01)

(58) Field of Classification Search
CPC ..... B60R 21/00; B60R 21/01; B60R 21/0136; B60R 21/015; B60R 21/01512; B60R 21/01516; B60R 21/0152; B60R 21/01522; B60R 21/01524; B60R 21/01526; B60R 21/01528; B60R 21/0153; B60R 21/01532; B60R 21/01534; B60R 21/01536; B60R 21/01538; B60R 21/0154; B60R 21/01542; B60R 21/01544; B60R 21/01546; B60R 21/01548; B60R 21/0155; B60R 21/01552; B60R 21/01554; B60R 21/01566; B60N 2/002; F02N 2200/106; G06V 20/59; G06V 20/593; G06V 20/597; G06V 10/82

See application file for complete search history.

(56) References Cited

U.S. PATENT DOCUMENTS

| | | | |
|---|---|---|---|
| 6,768,420 B2 | 7/2004 | McCarthy et al. | |
| 7,012,533 B2 | 3/2006 | Younse | |
| 7,353,088 B2* | 4/2008 | Eagen ................ | G08B 13/1663 702/56 |
| 7,415,126 B2 | 8/2008 | Breed et al. | |
| 9,428,109 B2 | 8/2016 | Binnicker | |
| 9,676,325 B1 | 6/2017 | Duan et al. | |

(Continued)

FOREIGN PATENT DOCUMENTS

| | | |
|---|---|---|
| CN | 101357615 A | 2/2009 |
| CN | 102259629 B | 11/2012 |

(Continued)

OTHER PUBLICATIONS

Unknown, "BabyProof Your Car-Never Ever Forget a Baby in Car", Indiegogo, printed Jul. 28, 2020, 4 pages.

(Continued)

*Primary Examiner* — Harry Y Oh
(74) *Attorney, Agent, or Firm* — James L. Olsen

(57) ABSTRACT

Sensor data can be collected from a first set of sensors associated with a first seat within a vehicle during a first vehicle stage. The outputs of each sensor of the first set of sensors can then be aggregated to calculate a probability of life within the first seat during the first vehicle stage.

23 Claims, 12 Drawing Sheets

(56) References Cited

U.S. PATENT DOCUMENTS

| | | | |
|---|---|---|---|
| 9,865,150 B2 | 1/2018 | Brankovic et al. | |
| 10,023,116 B2 | 7/2018 | Rovinsky | |
| 10,115,029 B1 | 10/2018 | Day et al. | |
| 11,263,890 B1* | 3/2022 | Garwood | B60N 2/002 |
| 2006/0139159 A1* | 6/2006 | Lee | B60N 2/002 |
| | | | 340/572.1 |
| 2006/0251293 A1 | 11/2006 | Piirainen et al. | |
| 2011/0074565 A1* | 3/2011 | Cuddihy | G08B 21/24 |
| | | | 340/457 |
| 2011/0121956 A1 | 5/2011 | Rodriguez | |
| 2012/0232749 A1 | 9/2012 | Schoenberg et al. | |
| 2014/0125355 A1* | 5/2014 | Grant | B61D 33/0057 |
| | | | 324/629 |
| 2015/0070503 A1* | 3/2015 | Kraeling | H04N 23/66 |
| | | | 348/148 |
| 2017/0240022 A1 | 8/2017 | Ireri | |
| 2018/0065504 A1 | 3/2018 | Lan et al. | |
| 2018/0099592 A1 | 4/2018 | Curry, V | |
| 2019/0077217 A1* | 3/2019 | Yu | B60H 1/0073 |
| 2019/0088103 A1 | 3/2019 | Lebron et al. | |
| 2019/0210550 A1 | 7/2019 | Hatfield et al. | |
| 2019/0215672 A1 | 7/2019 | Orris et al. | |
| 2020/0071967 A1* | 3/2020 | Adams | G08B 21/24 |
| 2020/0108734 A1* | 4/2020 | O'Sullivan | G06Q 10/02 |
| 2020/0171977 A1* | 6/2020 | Jales Costa | B60N 2/002 |
| 2020/0249042 A1* | 8/2020 | Warr | H04W 4/023 |
| 2021/0225152 A1* | 7/2021 | Taylor | B60H 1/00742 |
| 2022/0097637 A1* | 3/2022 | Kruger | B60R 21/01532 |
| 2022/0274516 A1* | 9/2022 | Withey | B60N 2/7017 |

FOREIGN PATENT DOCUMENTS

| | | |
|---|---|---|
| CN | 102874140 A | 1/2013 |
| CN | 103646501 A | 3/2014 |
| CN | 108711254 A | 10/2018 |
| CN | 110007366 A | 7/2019 |
| CN | 110619733 A | 12/2019 |
| CN | 110979236 A | 4/2020 |

OTHER PUBLICATIONS

Elepho, "Elepho eClip Baby Reminder for Your Car—Attaches to car seat, seat Belt and Diaper Bag—Connects to Smartphone via Low Power Bluetooth—Sends Proximity alerts, high and Low Temperature Warning", Amazon, printed Jul. 28, 2020, 8 pages.

Cybex, "Cybex Sirona M SensorSafe 2.0, Lavastone Black,Car Seat", Amazon, printed Jul. 28, 2020, 11 pages.

Ride N Remind, "Back Seat Reminder System—Professional Installation req", Amazon, printed Jul. 28, 2020, 8 pages.

CarLock, "CarLock—2nd Gen Advanced Real Time 3G Car Tracker & Alert System. Comes with Device & Phone App. Easily Tracks Your Car in Real Time & Notifies You Immediately of Suspicious Behavior.OBD Plug&Play", Amazon, printed Jul. 28, 2020, 11 pages.

GMC, "GMC's Rear Seat Reminder Can Help Remind Parents to Check the Back Seat", printed Jul. 28, 2020, 5 pages.

Geiger, J., "Nissan Launches Rear Door Alert System", Aug. 2, 2017, 4 pages.

Hyundai, "Hyundai to Make Rear Occupant Alert Standard by 2022", printed Jul. 28, 2020, 18 pages.

Orlewski et al., "Advanced Occupant Detection System: Detection of Human Vital Signs by Seat-Embedded Ferroelectric Film Sensors and by Vibration Analysis", Paper No. 11-0205, 8 pages.

Leonhardt et al., "Unobtrusive Vital Sign Monitoring in Automotive Environments—A Review", Sensors, 2018, 38 pages.

Lupinska-Dubicka et al., "The Concept of In-Vehicle System for Human Presence and Their Vital Signs Detection", Conference Paper, Feb. 2018, 13 pages.

Pekhale et al., "IoT based Intelligent Car System for Preventing Suffocation in Closed Car Cabin using Sensors", vol. 06 Issue: 07, Jul. 2019, 5 pages.

Mell et al., "The NIST Definition of Cloud Computing", Recommendations of the National Institute of Standards and Technology, Sep. 2011, 7 pages.

"Patent Cooperation Treaty PCT Notification of Transmittal of the International Search Report and the Written Opinion of the International Searching Authority, or the Declaration", Applicants file reference P201909728PCT, International Application No. PCT/IB2021/058589, International Filing date Sep. 21, 2021, dated Jan. 11, 2022, 10 Pgs.

* cited by examiner

MULTI-SENSOR LIFE DETECTION WITHIN VEHICLES

BACKGROUND

The present disclosure relates generally to the field of vehicle safety, and in particular, to multi-sensor life detection within vehicles.

When not running, the temperature inside a vehicle can rise rapidly, even on days with a seemingly mild temperature. Being left in a confined space with a rapidly rising temperature can be fatal, especially for young children. According to the National Safety Council (NSC), more than 38 children die each year as a result of being left in a hot vehicle in the United States alone, with majority being under the age of 3. In 2018, a record number of hot car deaths were recorded in the United States, involving 52 children under the age of 5. Of these deaths, only a small percentage include children who were intentionally left inside the vehicle. Instead, most hot car deaths are accidental, occurring when caregivers forget their children are in the backseat.

Several market solutions exist for preventing children from accidentally being left in a vehicle, but they are often limited in that they require forethought by caregivers to purchase and install. Likewise, vehicle manufacturers have begun to implement single-sensor back seat detection systems, which are limited in their ability to accurately detect life under all conditions without false positives. Overall, preexisting solutions to this issue lack in that they often 1) must be separately purchased and installed, 2) are only applicable to children in car seats, 3) collect insufficient data (e.g., from a single sensor) leading to inaccurate predictions, 4) issue alerts only based on sequential conditions being met, and/or 5) are active only during the end vehicle stage after the vehicle has been turned off.

SUMMARY

Embodiments of the present disclosure are directed to a method for life detection within vehicles. The method can include collecting sensor data from a first set of sensors associated with a first seat within a vehicle during a first vehicle stage. The method can further include aggregating outputs of each sensor of the first set of sensors to calculate a probability of life within the first seat during the first vehicle stage.

Advantageously, the aforementioned method allows life detection within vehicles using multiple sensors associated with the vehicle. Thus, aspects do not require separate purchase and installation as preexisting solutions in the art do. Further, aspects of the present disclosure are not limited to particular seats within a vehicle. Further still, by collectively considering sensor data received by multiple sensors within a vehicle, the probability of life can be more accurately calculated with reduced false positives and false negatives as apparent in simple one sensor systems.

Additional aspects of the present disclosure are directed to systems and computer program products configured to perform the methods described above.

Embodiments of the present disclosure relate to an additional method for life detection within vehicles. The method includes collecting, during a first vehicle stage, sensor data from each of a plurality of sets of sensors, each set associated with each of a plurality of respective seats within the vehicle. The method further includes aggregating outputs of each sensor of each respective set of sensors to calculate a probability of life for each seat within the vehicle during the first vehicle stage. The method further includes aggregating the probabilities of life for each seat to calculate a probability of life for the entire vehicle during the first vehicle stage. The method further includes calculating a probability of life throughout at least two stages of the vehicle by aggregating the probability of life for the entire vehicle during the first vehicle stage with a probability of life for the entire vehicle during at least one additional vehicle stage.

Advantageously, the aforementioned method allows life detection within vehicles using multiple sensors associated with the vehicle. Thus, aspects do not require separate purchase and installation as preexisting solutions in the art do. Further, aspects of the present disclosure are not limited to particular seats within a vehicle. Further still, by collectively considering sensor data received by multiple sensors within a vehicle, the probability of life can be more accurately calculated with reduced false positives and false negatives as apparent in simple one sensor systems. Further still, aspects allow probability of life calculations to be calculated for individual seats or a plurality of seats throughout various vehicle stages. Thus, the probability of life can be calculated throughout all stages of a vehicle, providing more comprehensive and accurate life detection calculations.

Additional aspects of the present disclosure are directed to computer program products configured to perform the additional method described above.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
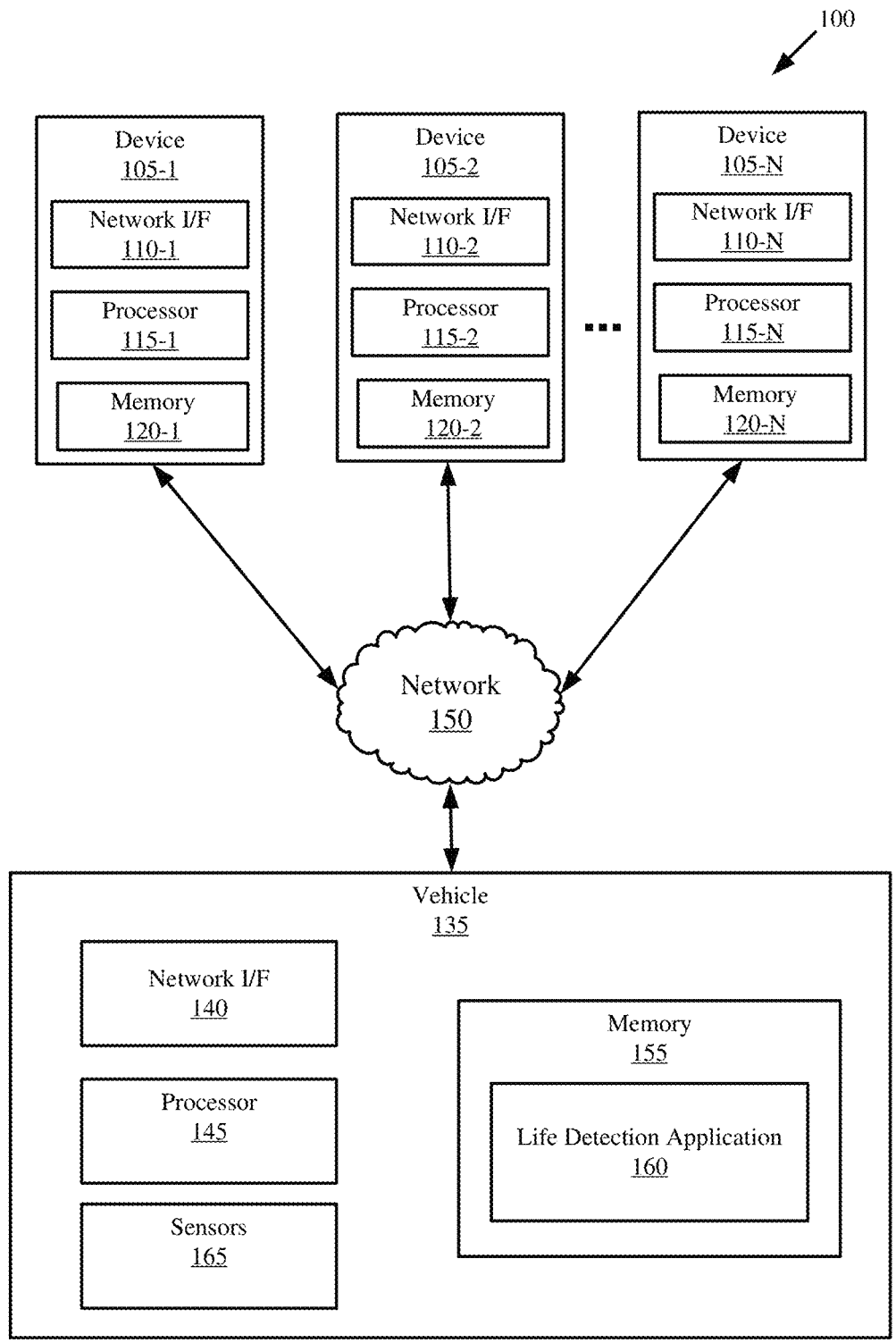
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of vehicle safety, and in particular, to multi-sensor life detection within vehicles. While the present disclosure is not necessarily limited to such applications, various aspects of the disclosure can be appreciated through a discussion of various examples using this context.

When not running, the temperature inside a vehicle can rise rapidly, even on days with a seemingly mild temperature. Being left in a confined space with a rapidly rising temperature can be fatal, especially for young children. According to the National Safety Council (NSC), more than 38 children die each year as a result of being left in a hot vehicle in the United States alone, with majority being under the age of 3. In 2018, a record number of hot car deaths were recorded in the United States, involving 52 children under the age of 5. Of these deaths, only a small percentage include children who were intentionally left inside the vehicle. Instead, most hot car deaths are accidental, occurring when caregivers forget their children are in the backseat.

Several market solutions exist for preventing children from accidentally being left in a vehicle, but they are often limited in that they require forethought by caregivers to purchase and install. Likewise, vehicle manufacturers have begun to implement single-sensor back seat detection systems, which are limited in their ability to accurately detect life under all conditions without false positives. Overall, preexisting solutions to this issue lack in that they often 1) must be separately purchased an installed, 2) are only applicable to children in car seats, 3) collect insufficient data (e.g., from a single sensor) leading to inaccurate predictions, 4) issue alerts only based on sequential conditions being met, and/or 5) are active only during the end vehicle stage after the vehicle has been turned off.

Figure 7:
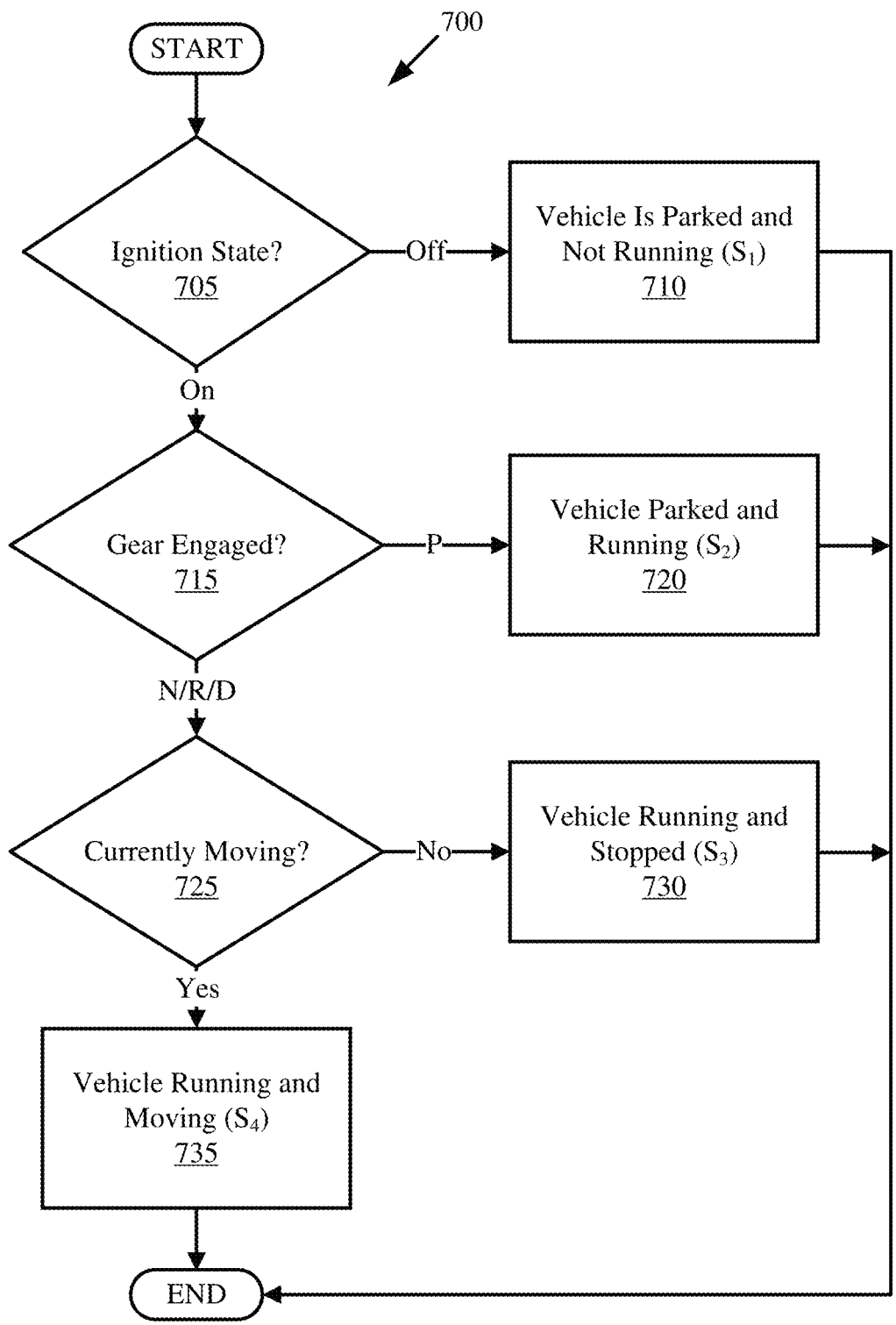
FIG. 7 is a flow-diagram depicting an example method for determining vehicle stages, in accordance with embodiments of the present disclosure.

Aspects of the present disclosure address the aforementioned complications using a multi-sensor life detection system. Sensor data can be collected from a first set of sensors associated with a first seat within a vehicle during a first vehicle stage (e.g., exemplary vehicle stages are depicted in FIG. 7). The outputs of each sensor can then be aggregated to calculate a probability of life (e.g., a probability that life such as a human or animal are present) within the first seat during the first vehicle stage.

In embodiments, additional sensor data can be collected, during the first vehicle stage, from each of a plurality of sets of sensors, each set associated with each of a plurality of respective seats within the vehicle. The outputs of each sensor of each respective set of sensors can be aggregated to calculate a probability of life for each seat within the vehicle during the first vehicle stage. Thereafter, in embodiments, the probability of life for each seat within the first vehicle stage can be aggregated to calculate a probability of life for the entire vehicle during the first vehicle stage.

In embodiments, a probability of life throughout at least two stages of the vehicle can be calculated by aggregating the probability of life for the entire vehicle during the first vehicle stage with a probability of life for the entire vehicle during at least one additional vehicle stage.

Various benefits are realized by the aforementioned embodiments. First, this solution can be fully integrated with the vehicle. Thus, aspects do not require separate purchase and installation as preexisting solutions in the art do. Further, aspects of the present disclosure are not limited to particular seats (e.g., seats having car seats installed in cars) within a vehicle. Aspects of the present disclosure allow for life to be detected in any individual seat within a vehicle, regardless of the seat configuration. Further still, aspects of the present disclosure can calculate the probability of life throughout various vehicle stages. Thus, the probability of life can be calculated throughout all stages of a vehicle, providing more comprehensive and accurate life detection calculations. Further, by collectively considering sensor data received by multiple sensors within a vehicle, the probability of life can be more accurately calculated with reduced false positives and false negatives as apparent in simple one sensor systems.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one vehicle 135, and a network 150.

The devices 105 and the vehicle 135 include one or more processors 115-1, 115-2 . . . 115-N (collectively processors 115) and 145 and one or more memories 120-1, 120-2 . . . 120-N (collectively memories 120) and 155, respectively. The devices 105 and the vehicle 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the vehicle 135 can be equipped with a display. Additionally, the devices 105 and/or the vehicle 135 can include optional input devices (e.g., a keyboard, mouse, scanner, a biometric scanner, video camera, or other input device), and/or any commercially available or custom software (e.g., browser software, communications software, natural language processing software, search engine and/or web crawling software, image processing software, etc.). In embodiments, devices 105 can be mobile devices, wearables, laptops, etc. The vehicle 135 can be any suitable vehicle configured to transport individuals from a starting location to a destination, including cars, trucks, buses, aircrafts, boats, and the like. In some embodiments, the vehicle 135 can be semi or fully autonomous.

The devices 105 and the vehicle 135 can be distant from each other and communicate over a network 150. In some embodiments, a server (not shown) can be a central hub from which devices 105 and vehicle 135 can establish a communication connection, such as in a client-server networking model. Alternatively, the vehicle 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the vehicle 135 can be local to each other and communicate via any appropriate local communication medium. For example, the devices 105 and the vehicle 135 can communicate using a local area network (LAN), one or more hardwire connections, a wireless link or router, or an intranet. In some embodiments, the devices 105 and the vehicle 135 can be communicatively coupled using a combination of one or more networks and/or one or more local connections. For example, the first device 105-1 can be hardwired to the vehicle 135 (e.g., connected with an Ethernet cable) while the second device 105-2 can communicate with the vehicle 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 9.

The vehicle 135 includes a life detection application 160. The life detection application 160 can be configured to determine the probability of life within the vehicle 135. In embodiments, the probability of life can be calculated per seat (e.g., seat 210 of FIG. 2) and/or within particular vehicle stages (e.g., example vehicle stages are shown in FIG. 7). In embodiments, the probability of life per seat and/or within particular vehicle stages can be aggregated (e.g., collectively considered) to calculate the probability of life within the entire vehicle throughout various vehicle stages. The determinations output by the life detection application 160 can be transmitted to devices 105 over the network. This allows users to take action to mitigate any risk to life within the vehicle 135. In some embodiments, one or more features of the vehicle 135 can be activated in response to a probability of life exceeding a threshold. For example, in response to determining that the probability of life exceeds a threshold when the vehicle 135 is not running, the vehicle 135 can be powered on and the air conditioning (A/C) can be activated, the windows can be opened, the doors can be unlocked, and/or the doors can be opened. Issuing alerts and/or activating vehicle features to attempt to support life within the vehicle are herein referred to as "life preservation actions."

Sensors 165 of the vehicle 135 can be configured to collect data regarding the conditions in the environment of the vehicle 135. Various vehicle sensors 165 can be implemented, including, but not limited to, weight sensors, motion sensors (e.g., optical based motion sensors), temperature sensors, audio/video system sensors, microphones, cameras, door sensors, window sensors, seat belt sensors, and lock sensors. In embodiments, sensors 165 can be configured to periodically collect data (e.g., based on a polling frequency) and/or collect data in response to a state change. For example, a motion sensor can be configured to periodically collect data (e.g., every 10 seconds) while a lock sensor can be configured to collect data upon a state change (e.g., the lock transitions from locked to unlocked, or vice versa).

In embodiments, sensors 165 can be associated with particular seats or the entire vehicle. For example, a lock sensor, window sensor, seat belt sensor, and door sensor can be associated with a first seat, while a temperature sensor and motion sensor can collect data regarding the state of the entire vehicle. Thus, when calculating the probability of life for individual seats within the vehicle 135, the probability of life for each seat can consider respective seat sensors and vehicle encompassing sensors (that collect data regarding the state of the entire vehicle).

In embodiments, the metrics collected from sensors 165 that are used to calculate probability of life are weighted based on values collected from other sensors and/or based on the stage of the vehicle. For example, an audio/video (A/V) system sensor (e.g., a sensor configured to detect whether the vehicle 135 is currently emitting audio through speakers) may affect the weight a microphone has on the probability of life calculation, as the A/V system may be emitting the sound received by the microphone (thus potentially negatively impacting the microphone's ability to detect life). As another example, motion sensor data may be weighted differently based on the stage of the vehicle (e.g., a motion sensor may be weighted greater when the vehicle is stopped than when the vehicle is moving).

The outputs collected from sensors 165 over time, based on polling and/or state changes, can be aggregated to calculate the probability of life for each respective seat within a current vehicle stage. The probability of life for each respective seat within the current vehicle stage can then be aggregated to calculate the probability of life within the entire vehicle within the current vehicle stage. The probability of life within the current vehicle stage can then be propagated (e.g., considered in the future) when calculating the probability of life within a next vehicle stage. Thus, the probability of life within all stages of the entire vehicle can consider the probability of life within each seat as well as the probability of life calculations for the vehicle 135 within previous vehicle stages.

In embodiments, the weighting of sensor data used to calculate probability of life within the vehicle 135 can be fine-tuned, for example, using machine learning algorithms. That is, feedback can be received regarding whether or not there was actually life within the vehicle at the time the probability of life was calculated. Based on the feedback received as compared to the probability of life calculation, adjustments can be made to weightings of individual sensor values used to calculate the probability of life. This can iterate continuously to increase the accuracy of the probability of life calculations, by ensuring sensor data outputs receive proper weighting when calculating the probability of life within the vehicle 135.

Machine learning algorithms that can be used to adjust the weight of sensors 165 used to calculate probability of life within vehicle 135 can include but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), nonnegative metric factorization (NMF), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Though FIG. 1 depicts life detection application 160 as integral with vehicle 135, in embodiments, aspects of the life detection application 160 can be remotely located (e.g., stored on a server or devices 105). In these embodiments, the vehicle 135 can transmit sensor data over the network 150 for processing.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. Further, the various models, modules, systems, and components illustrated in FIG. 1 can exist, if at all, across a plurality of devices, servers, and/or vehicles.

Figure 2:
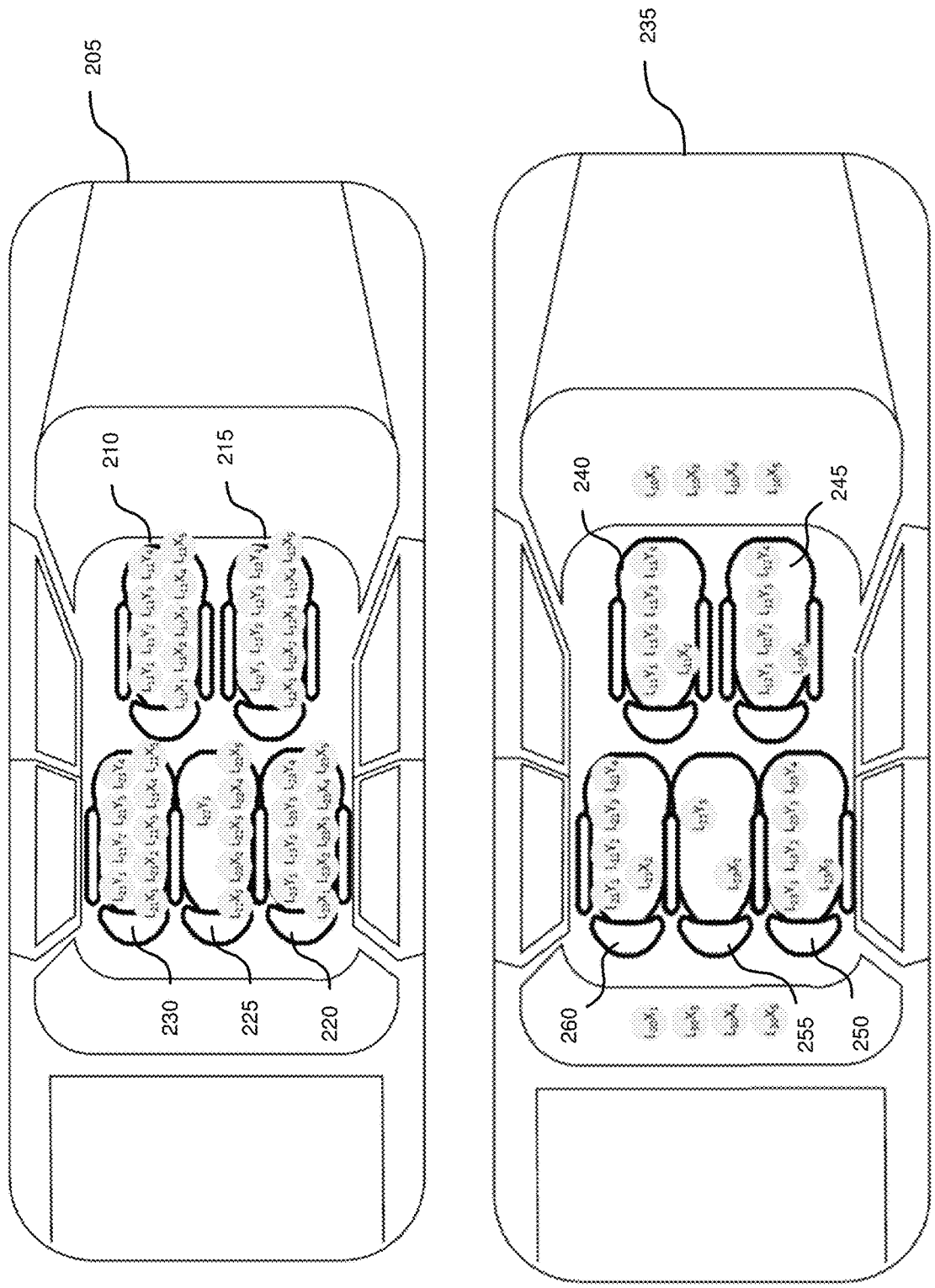
FIG. 2 is a diagram depicting two exemplary vehicle sensor configurations, in accordance with embodiments of the present disclosure.

Referring now to FIG. 2, shown is a diagram depicting two vehicle sensor configurations, in accordance with embodiments of the present disclosure. A first vehicle 205 configuration includes sensors associated with a first seat 210 through a fifth seat 230. A second vehicle 235 configuration includes sensors associated with a first seat 240 through a fifth seat 260 and further includes vehicle encompassing sensors (e.g., sensors, such as vehicle motion sensors and/or temperature sensors, that can collect data regarding the state of the entire vehicle). It is noted that the vehicle and sensor configurations (e.g., the number of seats, the number of sensors per seat, and the type of sensors) shown in FIG. 2 are merely exemplary, and any suitable vehicle and/or sensor configuration can be implemented.

As discussed with respect to FIG. 2, a "$Y_n$" sensor refers to a sensor that outputs data upon state change (e.g., a door sensor, a window sensor, a seat belt sensor, a lock sensor, etc.) and an "$X_m$" sensor refers to a sensor that outputs data periodically (e.g., a motion sensor, a microphone, a weight sensor, etc.). "$L_{rc}$" refers to the location of a given sensor within a vehicle based on seat. The "r" identifier within "$L_{rc}$" refers to the row number of the sensor from the front of the vehicle to the back of the vehicle. The "c" identifier within "$L_{rc}$" refers to the column number of the sensor, from the left side of the vehicle to the right side of the vehicle. Thus, the $L_{11}Y_1$ sensor associated with the first seat 210 of the first vehicle 205 refers to a first state change sensor located in the first row and the first column. Similarly, the $L_{11}X_1$ sensor associated with the first seat 210 of the first vehicle 205 refers to a first periodic sensor located in the first row and the first column. Sensors having the notation "$L_{r0}$" refer to sensors that collect output for the entire vehicle. As shown in vehicle 235, sensors $L_{10}X_{1-5}$ refer to sensors located in the first row that collect output for the entire vehicle and sensors $L_{30}X_{1-5}$ refer to sensors located in the third row that collect output for the entire vehicle.

Figure 3:
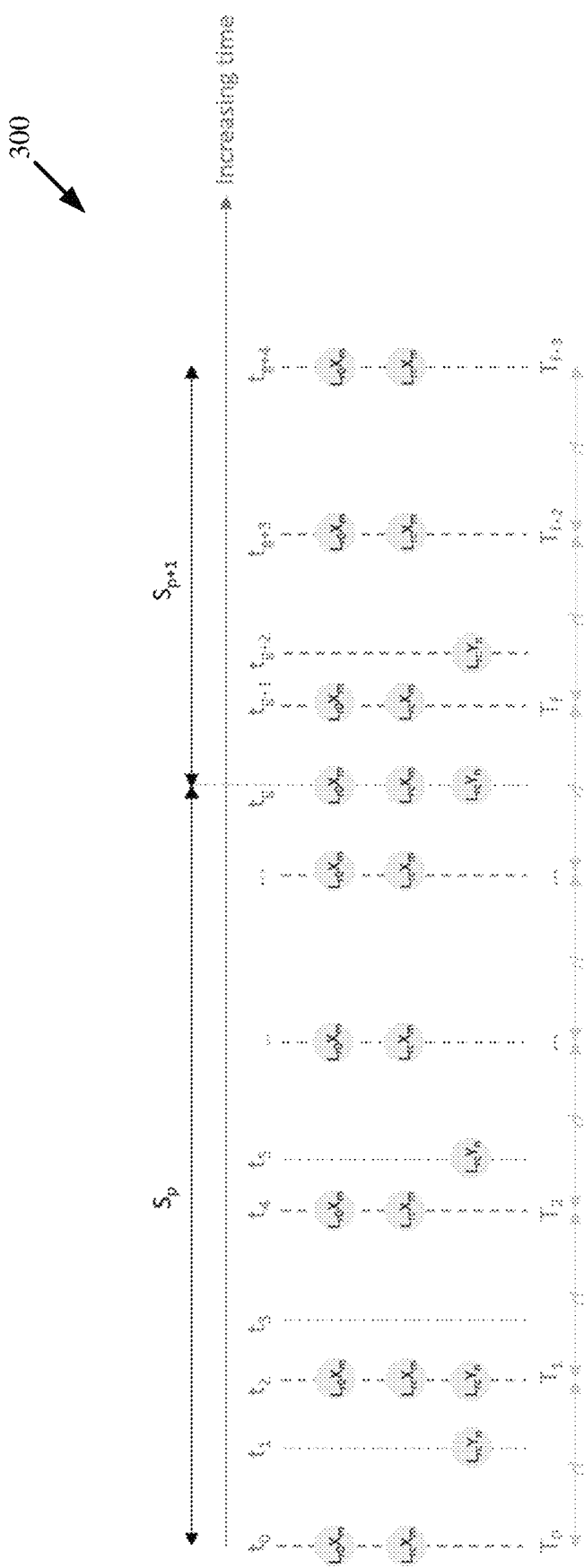
FIG. 3 is a diagram depicting sensor outputs over time across two vehicle stages, in accordance with embodiments of the present disclosure.

Referring now to FIG. 3, shown is a diagram 300 depicting sample sensor outputs over time in a first vehicle stage "$S_p$" and a second vehicle stage "$S_{p+1}$," in accordance with embodiments of the present disclosure. It is noted that the sensor outputs depicted in FIG. 3 are merely exemplary, and any suitable sensor outputs can be collected over any suitable time frame and/or number of vehicle stages.

As depicted in FIG. 3, at each time interval d (e.g., based on the polling frequency), data is collected from $L_{r0}X_m$ and $L_{rc}X_m$ sensors. Thus, at $t_0$, $t_2$, $t_4$ . . . etc. $L_{r0}X_m$ and $L_{rc}X_m$ sensor data can be collected (e.g., upon every interval d). At each state change, $L_{rc}Y_n$ sensor data can be collected from applicable $L_{rc}Y_n$ sensors. As shown in FIG. 3, $L_{rc}Y_n$ sensor data is collected at $t_1$ and $t_5$. Upon transition from the first vehicle stage $S_p$ to the second vehicle stage $S_{p+1}$, at time $t_g$, the output of all applicable sensors $L_{r0}X_m$, $L_{rc}X_m$, and $L_{rc}Y_n$ can be collected. Thereafter, $L_{r0}X_m$ and $L_{rc}X_m$ sensor data can continue to be collected every d interval and $L_{rc}Y_n$ sensor data can continue to be collected upon applicable state changes.

Figure 4:
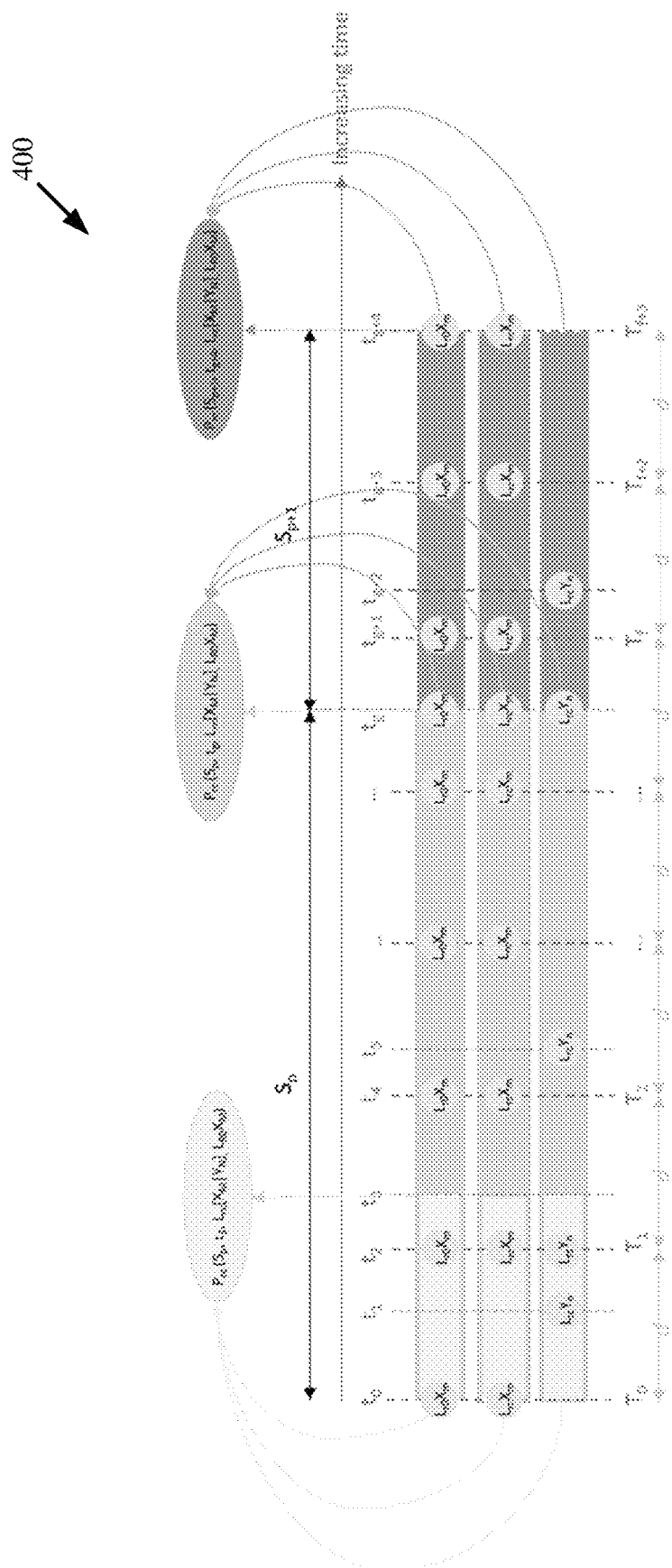
FIG. 4 is a diagram depicting probability of life calculations for individual seats within a vehicle, in accordance with embodiments of the present disclosure.

Referring now to FIG. 4, shown is a diagram 400 depicting example probability of life calculations for a seat in a vehicle at various times over two vehicle stages, in accordance with embodiments of the present disclosure. As depicted in FIG. 4, at time $t_3$, the probability of life for a given seat "$P_{rc}$" is expressed as $P_{rc}$ ($S_p$, $t_3$, $L_{rc}[X_M|Y_N]$, $L_{r0}X_m$). In this expression, $S_p$ denotes the vehicle stage, $t_3$ denotes the time, $L_{rc}[X_M|Y_N]$ denotes the set of all $L_{rc}X_m$ and $L_{rc}Y_n$ sensor outputs, and $L_{r0}X_m$ denotes the set of all $L_{r0}X_m$ outputs. In this expression, each sensor value (e.g., an $L_{rc}X_m$, $L_{rc}Y_n$, or $L_{r0}X_m$ value) can express a probability of life, which can be denoted, for example, between 0 and 1, where 0 denotes a minimum confidence in the probability of life and 1 depicts a maximum confidence in the probability of life within a given seat. As discussed above, the values output by individual sensors can be weighted based on other sensor values and/or the vehicle stage $S_p$. $P_{rc}$ ($S_p$, $t_3$, $L_{rc}[X_M|Y_N]$, $L_{r0}X_M$) denotes the collective consideration of all sensor outputs for a given seat at $t_3$ during the vehicle stage $S_p$.

At $t_g$, the output of all applicable sensors $L_{r0}X_m$, $L_{rc}X_m$, and $L_{rc}Y_n$ can be collected. The probability of life $P_{rc}$ for the seat in the vehicle at time $t_g$ is then expressed as $P_{rc}$ ($S_p$, $t_g$, $L_{rc}[X_M|Y_N]$, $L_{r0}X_M$). This represents the probability of life in a given seat throughout the duration of the first vehicle stage $S_p$. At time $t_{g+4}$, the probability of life $P_{rc}$ on a given seat during the second vehicle stage $S_{p+1}$ is represented by $P_{rc}$ ($S_{p+1}$, $t_{g+4}$, $L_{rc}[X_M|Y_N]$, $L_{r0}X_M$).

Figure 5:
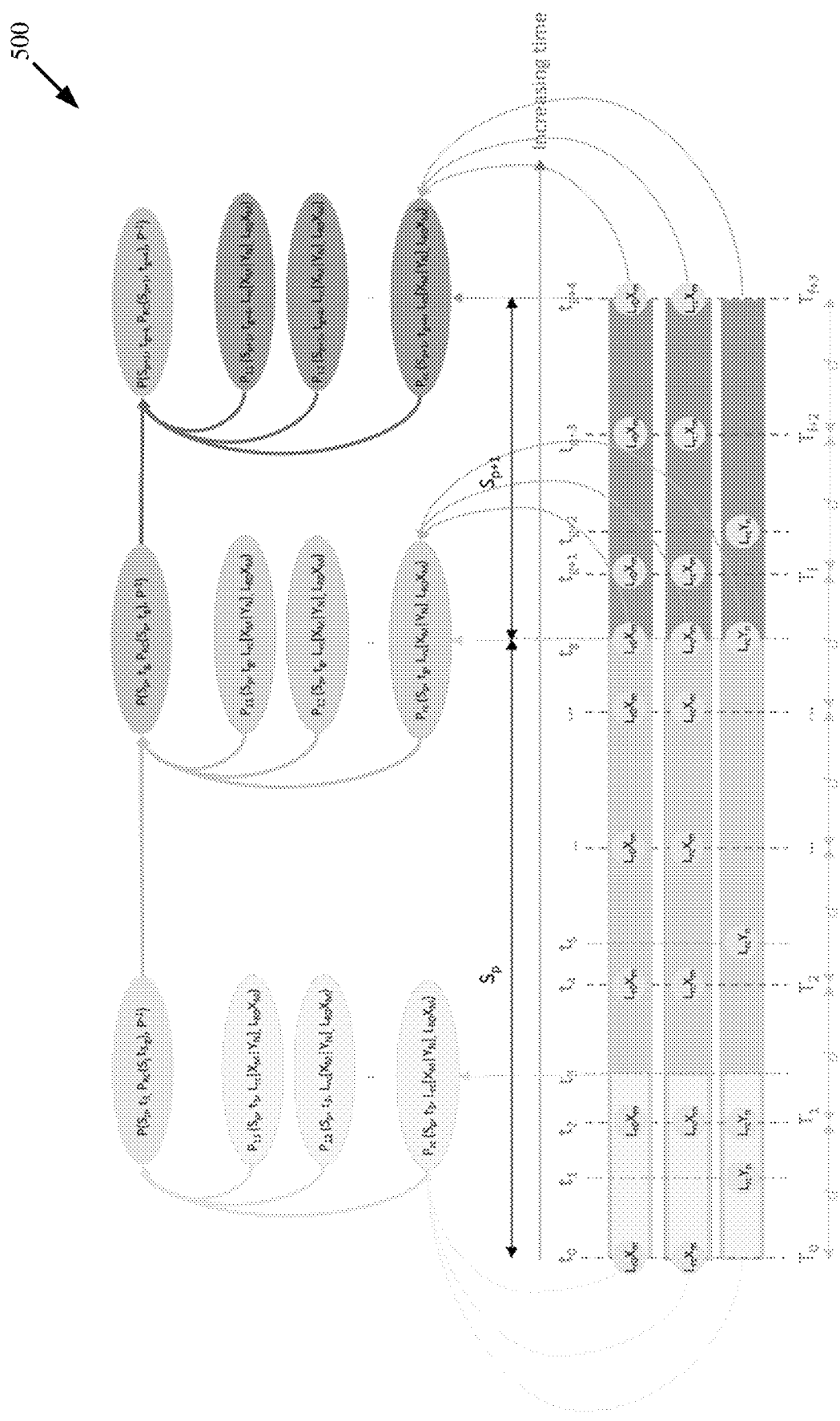
FIG. 5 is a diagram depicting probability of life calculations for an entire vehicle across multiple vehicle stages, in accordance with embodiments of the present disclosure.

Referring now to FIG. 5, shown is a diagram 500 depicting example probability of life calculations for an entire vehicle by collectively considering all probability of life calculations for respective seats within the vehicle at various times, in accordance with embodiments of the present disclosure.

As depicted in FIG. 5, the probability of life for a first and second seat at time $t_3$ can be denoted as $P_{11}$ ($S_p$, $t_3$, $L_{rc}[X_M|Y_N]$, $L_{r0}X_M$) and $P_{12}$ ($S_p$, $t_3$, $L_{rc}[X_M|Y_N]$, $L_{r0}X_M$), respectively. The probabilities of life for the first and second seat can then be collectively considered (e.g., aggregated) to arrive at the probability of life for the entire vehicle $P(S_p, t_3, P_{RC}(S_p, t_3), P^{-1})$. In this expression, P represents the probability of life for the entire vehicle, $S_p$ represents the vehicle stage, $t_3$ represents the time, $P_{RC}(S_p, t_g)$ represents the probabilities of life for all legally available seats (e.g., a seat having a seat belt) at time $t_3$ during vehicle stage $S_p$ (e.g., $P_{11}$ ($S_p$, $t_3$, $L_{rc}[X_M|Y_N]$, $L_{r0}X_M$) and $P_{12}$ ($S_p$, $t_3$, $L_{rc}[X_M|Y_N]$, $L_{r0}X_M$)), and $P^{-1}$ represents the preceding probability of life calculation for the vehicle (e.g., calculated during a previous time or stage). Thus, the probability of life calculated for each respective seat as well as the previously determined probability of life for the entire vehicle can be collectively considered when calculating probability of life for the entire vehicle at a given time during a given vehicle stage. As shown in FIG. 5, $P(S_p, t_g, P_{RC}(S_p, t_g), P^{-1})$ represents the probability of life for the entire vehicle at the end of the stage $S_p$ at $t_g$ and $P(S_{p+1}, t_{g+4}, P_{RC}(S_{p+1}, t_{g+4}), P^{-1})$ represents the probability of life for the entire vehicle at $t_{g+4}$ during stage $S_{p+1}$.

Figure 6A:
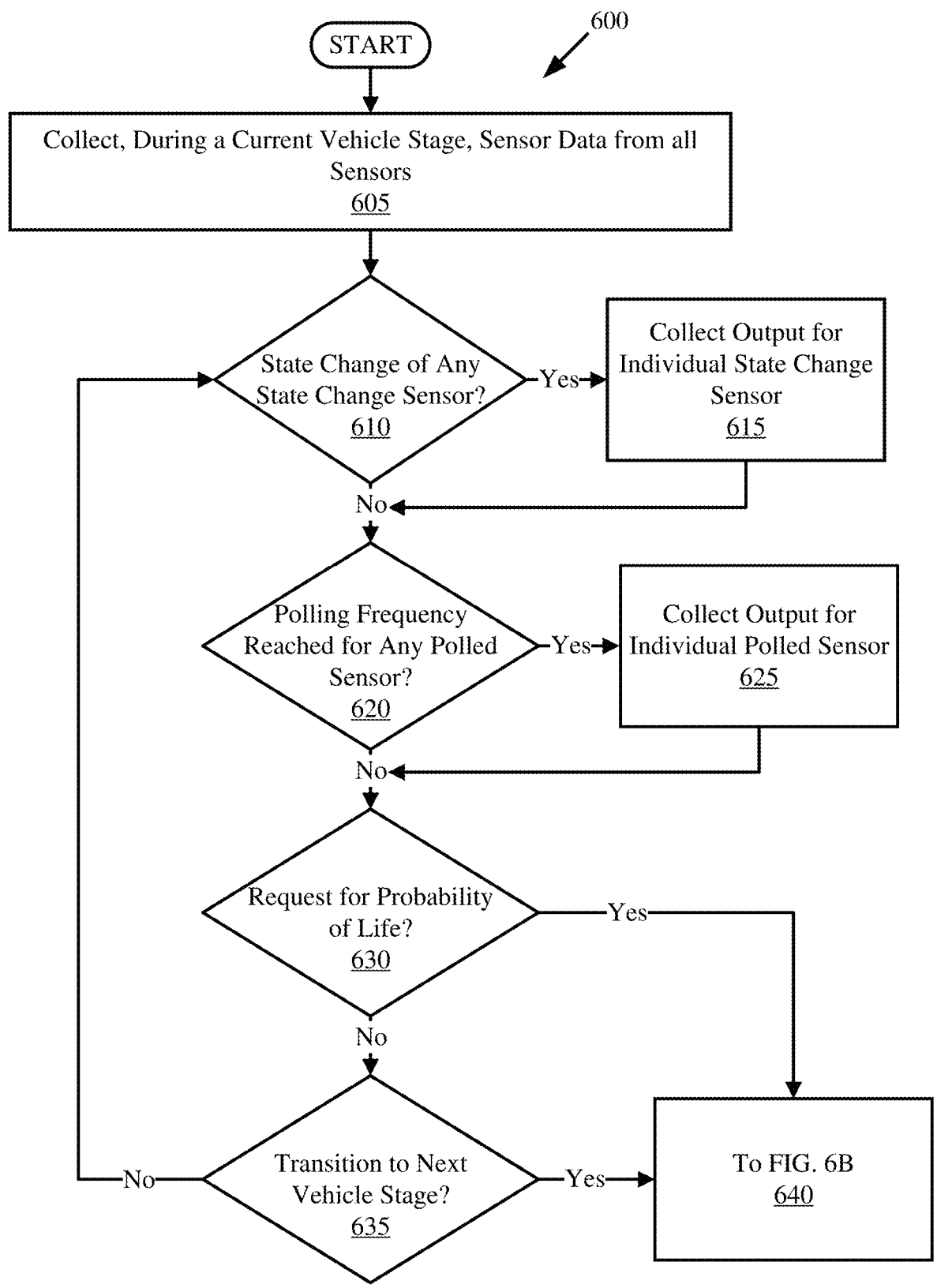
FIG. 6A and FIG. 6B are flow-diagrams collectively depicting an example method for calculating probability of life within a vehicle, in accordance with embodiments of the present disclosure.
Figure 6B:
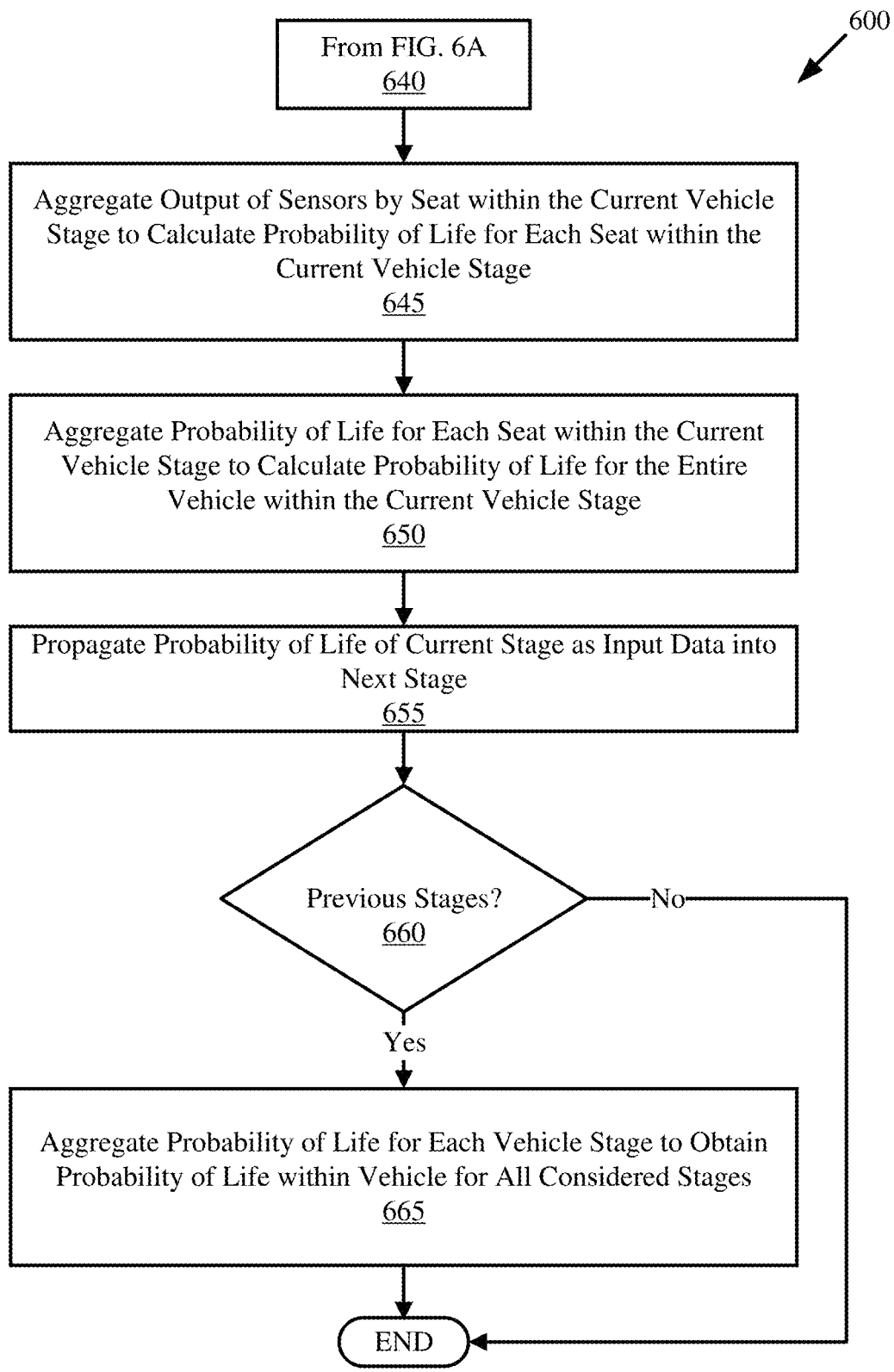

Referring now to FIGS. 6A and 6B, shown are flow diagrams collectively illustrating a method 600 for calculating probabilities of life for individual seats, for individual vehicle stages, and for the entire vehicle over various vehicle stages, in accordance with embodiments of the present disclosure. One or more operations depicted in FIGS. 6A-6B can be completed by one or more computing devices (e.g., vehicle 135, devices 105, or a server).

Method 600 initiates at operation 605, where sensor data is collected from all sensors of a vehicle during a current vehicle stage. The current output of all sensors can initially be collected at any suitable time. For example, the collection can be initiated in response to a user request, in response to a vehicle stage transition, or in response to any other suitable predetermined trigger (e.g., a particular time, a particular location, etc.). As discussed above, various vehicle sensors can be implemented, including, but not limited to weight sensors, motion sensors (e.g., optical based motion sensors), temperature sensors, audio/video system sensors, microphones, cameras, door sensors, window sensors, seat belt sensors, and lock sensors. Thereafter, sensor data can continue to be collected based on a polling frequency (e.g., over a predetermined time period), based on state changes, or based on a vehicle stage transition.

A determination is then made whether a state change occurred for any state change sensor. This is illustrated at operation 610. State change sensors can include sensors that change from a first state to a second state. Example state change sensors include door lock sensors (having states locked and unlocked), window sensors (having states open and closed), door sensors (having states open and closed), seat belt sensors (having states buckled and unbuckled), and A/V system sensors (having states on and off). In embodiments, the state changes can be binary, with two possible states. However, in embodiments, state changes can be partial (e.g., a volume change of an A/V system, a partially open window, etc.).

If a determination is made that a state change occurred for any state change sensor, then the output is collected from the individual state change sensor that changed states. This is illustrated at operation 615. Thus, state change sensor data can continue to be collected throughout method 600 in response to any state change sensor state transition. As depicted in FIG. 3, data from state change sensors $Y_{rc}Y_n$ is collected at times $t_1$, $t_5$, $t_g$, and $t_{g+2}$.

A determination is then made whether a polling frequency is reached for any polled sensors. This is illustrated at operation 620. Polled sensors can include sensors from which sensor data is collected periodically. Example polled sensors include motion sensors, temperature sensors, weight sensors, cameras, and microphones. The polling frequency of individual sensors can vary. For example, sensor data from a first polled sensor (e.g., a camera) can be collected at a first time interval (e.g., every second) and sensor data from a second polled sensor (e.g., a temperature sensor) can be collected at a second time interval (e.g., every minute).

If a determination is made that a polling frequency is reached for any polled sensor, then the sensor output is collected for any individual polled sensor for which the polling frequency is reached. This is illustrated at operation 625. Thus, polled sensor data can continue to be collected throughout method 600 in response to any polled sensor reaching a respective polling frequency. As depicted in FIG. 3, data from polled sensors $X_{rc}X_m$ is collected every d time interval at $t_0$, $t_2$, $t_4$, $t_{g+1}$, $t_{g+3}$, and $t_{g+4}$.

In embodiments, upon the collection of sensor data, the output of the sensor data can be processed into a value indicative of probability of life. For example, the value of a weight sensor, motion sensor, lock sensor, etc. can be processed into a value between 0 and 1, where 0 indicates a minimum confidence in the probability of life and where 1 indicates a maximum confidence in a probability of life. As an example, if a weight sensor value for a given seat outputs, e.g., 50 lbs, the 50 lb value can be processed into an output "0.75," indicating a high confidence in probability of life. However, relying on this single sensor value may not be accurate, as the weight applied to the seat may not be life. Thus, the weight sensor can be weighted and aggregated with other sensor value outputs to accurate predict the probability of life. Ultimately, each sensor output can be processed into a standardized value such that the sensor values can be aggregated to calculate the probability of life for each seat within a vehicle.

A determination is then made whether there is a request for a probability of life from a user. This is illustrated at operation 630. In embodiments, the request can be received from a user on a graphical user interface (GUI) of a device or the vehicle. For example, the user request for the probability of life can be received on a graphical user interface associated with life detection application 160 on vehicle 135 or on a display of device 105-1. In some embodiments however, the request may not be initiated by a user and rather may be automatically issued based on a predetermined trigger. For example, the probability of life can automatically be requested (e.g., by one or more processing circuits of a vehicle) in response to a vehicular trigger, such as a door opening, a window opening, a seat belt state change. If a determination is made that there is a request for a probability of life within the vehicle, then method 600 proceeds to FIG. 6B at operation 640. If a determination is made that there is not a request for a probability of life within the vehicle, then method 600 proceeds to operation 635, where a determination is made whether the vehicle transitioned to a next vehicle stage.

If a determination is made that the vehicle transitioned to a next vehicle stage, then method 600 proceeds to FIG. 6B at operation 640. If a determination is made that the vehicle did not transition to a next vehicle stage, then method 600 returns to operation 610, where a determination is made whether a state change occurred for any state change sensor. Thus, within a current vehicle stage (e.g., between operations 610 and 635), sensor data can continually be collected at operations 615 and 625, when applicable. Example triggers for vehicle stage transitions are depicted in FIG. 7.

Referring now to FIG. 6B, if a determination is made that there is a request for a probability of life at operation 630 or if a determination is made that the vehicle transitioned stages at operation 635, method 600 proceeds from operation 640 to operation 645, where the output of sensors collected throughout FIG. 6A are aggregated to calculate the probability of life for each seat within the current vehicle stage. For example, as shown in FIG. 4, $P_{rc}$ ($S_p$, t, $L_{rc}$ [$X_M|Y_N$], $L_{ro}X_M$) can be calculated for each respective seat. As discussed above, the output of each individual sensor $L_{ro}X_m$, $L_{rc}X_m$, and/or $L_{rc}Y_n$ can be processed into a value between 0 and 1, where 0 indicates a minimum confidence in the probability of life and 1 indicates a maximum confidence in the probability of life. Further, each value can be weighted depending on the type of sensor, the output of other sensors, and/or the current vehicle stage. Aggregating individual sensors to calculate probability of life for a respective seat can include adding each processed sensor output multiplied by each respective weight.

The probability of life calculated for each respective seat "$P_{rc}$" within the current vehicle stage are then aggregated to calculate the probability of the entire vehicle within the current vehicle stage. This is illustrated at operation 650. For example, as shown in FIG. 5, $P_{11}$ ($S_p$, t, $L_{rc}$[$X_M|Y_N$], $L_{ro}X_M$) and $P_{12}$ ($S_p$, t, $L_{rc}$[$X_M|Y_N$], $L_{ro}X_M$) corresponding to a first and second seat can be aggregated to calculate the probability of life $P(S_p, t, P_{RC}(S_p, t))$ for the entire vehicle, where $P_{RC}$ represents the aggregated probability of life between the first and second seats. Any suitable aggregation technique can be used to calculate the probability of life for the entire vehicle, including an average, max, minimum, and/or median applied across the data set having the probability of life for each individual seat. For example, if a probability of life output for a first seat is "1.0" and a probability of life output for a second seat is "0.5," if only two seats are present in the vehicle, aggregating the probabilities of life could including calculating an average value (e.g., 0.75), a maximum value (e.g., 1.0), a minimum value (e.g., 0.50), or a median (e.g., 1.0 or 0.50) of the two probabilities of life for each respective seat.

The probability of life calculated for the entire vehicle of the current vehicle stage is then propagated as input data into the next vehicle stage. This is illustrated at operation 655. Thus, future probabilities of life for the entire vehicle can be calculated according to $P(S_p, t, P_{RC}(S_p, t), P^{-1})$, where $P^{-1}$ represents the probability of life calculated for a preceding vehicle stage. Thus, the probability of life for the entire vehicle at the current vehicle stage computed at operation 650 can be stored in memory and utilized at a future time to increase the accuracy of future probability of life calculations within future vehicle stages.

A determination is then made whether there are previous vehicle stages. This is illustrated at operation 660. If a determination is made that there are previous vehicle stages, then the probability of life for the entire vehicle for each vehicle stage are aggregated to obtain the probability of life within the entire vehicle across all considered stages. This is illustrated at operation 665. Thus, probabilities of life for previous vehicle stages stored at operation 655 are propagated as input data into probability of life calculations for the entire vehicle across multiple stages. For example, as depicted in FIG. 5, $P(S_{p+1}, t, P_{RC}(S_{p+1}, t), P^{-1})$ considers the probability of life $P^{-1}$ calculated at a previous time and/or stage (e.g., stage $S_p$ or time $t_5$, for example).

The probabilities of life calculated for individual seats at operation 645, for the entire vehicle for particular vehicle stages at operation 650, and/or the entire vehicle across multiple considered stages at operation 665 can be transmitted to a user at any suitable time. For example, upon any probability of life calculation, the probability of life can be transmitted to a user such that they can be aware of the life state within their vehicle. As an example, when a vehicle transitions from a "running and parked stage" to a "not running and off stage," the probabilities of life for each respective stage can be transmitted to the user at the beginning of each respective vehicle stage.

In embodiments, if the probability of life for an individual seat, for the entire vehicle, and/or for the entire vehicle across multiple stages exceeds a threshold value, then a life preservation action can be executed (e.g., by the life detection application 160). Life preservation actions can include issuing alerts (e.g., notifying devices 105, calling a user, calling a monitoring station, etc.) and activating vehicle features (e.g., activating a vehicle alarm, automatically opening a door, activating an air conditioning system, automatically opening a window, automatically unlocking a door, etc.). Such actions can prevent or mitigate danger caused by rising temperatures within the vehicle. Issuing life preservation actions is further described with respect to FIG. 8.

In embodiments, feedback can be collected regarding the probability of life calculations output at operations 645, 650, and 665. The feedback can indicate whether or not there was indeed life present in a particular vehicle seat during a particular vehicle stage, in the entire vehicle during a particular vehicle stage, and/or in the entire vehicle across multiple considered stages. Based on the comparison between the received feedback and the probability of life, weightings of values used to calculate probability of life can be adjusted. In embodiments, one or more machine learning algorithms can be configured to make adjustments to weightings based on received feedback such that more accurate probability of life calculations can be made in the future. As an example, if a probability of life for a first seat during a first vehicle stage is "1.0" (e.g., indicating a maximum probability of life) and feedback indicated that life was not present in the vehicle, then a weighting of a first sensor value used to calculate the probability of life for the first seat during the first vehicle stage can be altered (e.g., decreased using a machine learning algorithm).

The aforementioned operations can be completed in any order and are not limited to those described. Additionally, some, all, or none of the aforementioned operations can be completed, while still remaining within the spirit and scope of the present disclosure. For example, in some embodiments, state change sensor data may not be collected at operation 615 if state change sensors are not considered for the probability of life calculations. As another example, in some embodiments, operations 650 and/or 665 may not be completed, as probability of life calculations may merely be calculated on a per-seat basis only.

Referring now to FIG. 7, shown is flow diagram illustrating an example method 700 for determining vehicle stages of a vehicle, in accordance with embodiments of the present disclosure. One or more operations of FIG. 7 can be completed by one or more computing devices (e.g., devices 105, vehicle 135, and/or a server). The vehicle stages described with respect to FIG. 7 can be the same as, or substantially similar to, the vehicle stages described with respect to FIGS. 1-6B.

Method 700 initiates at operation 705, where a determination is made whether the ignition state of the vehicle is "On" or "Off". If the ignition state is "Off", a determination is made that the vehicle is in the stage ($S_1$) parked and not running. This is illustrated at operation 710.

If a determination is made that the ignition state is "On," then a determination is made whether the gear is engaged in park "P" or neutral, reverse, or drive "N/R/D." This is illustrated at operation 715. If the gear is engaged in park "P," then a determination is made that the vehicle is in the stage (S$_2$) parked and running. This is illustrated at operation 720.

If a determination is made that the gear is engaged in neutral, reverse, or drive "N/R/D," then a determination is made whether the vehicle is currently moving. This is illustrated at operation 725. Determining whether the vehicle is currently moving can be completed based on accelerometer data, speedometer data, braking data, or any other suitable data indicative of a mobility state of the vehicle. If a determination is made that the vehicle is not moving, then a determination is made that the vehicle is in the stage (S$_3$) running and stopped. This is illustrated at operation 730. If a determination is made that the vehicle is currently moving at operation 725, then a determination is made that the vehicle is in the stage (S$_4$) running and moving. This is illustrated at operation 735.

The aforementioned operations can be completed in any order and are not limited to those described. Additionally, some, all, or none of the aforementioned operations can be completed, while still remaining within the spirit and scope of the present disclosure. Further, the vehicle stages described with respect to FIG. 7 are merely exemplary. Any suitable vehicle stages consistent herein can be utilized without departing from the spirit and scope of the present disclosure. For example, the vehicle stages can vary based on the type of vehicle implemented.

Figure 8:
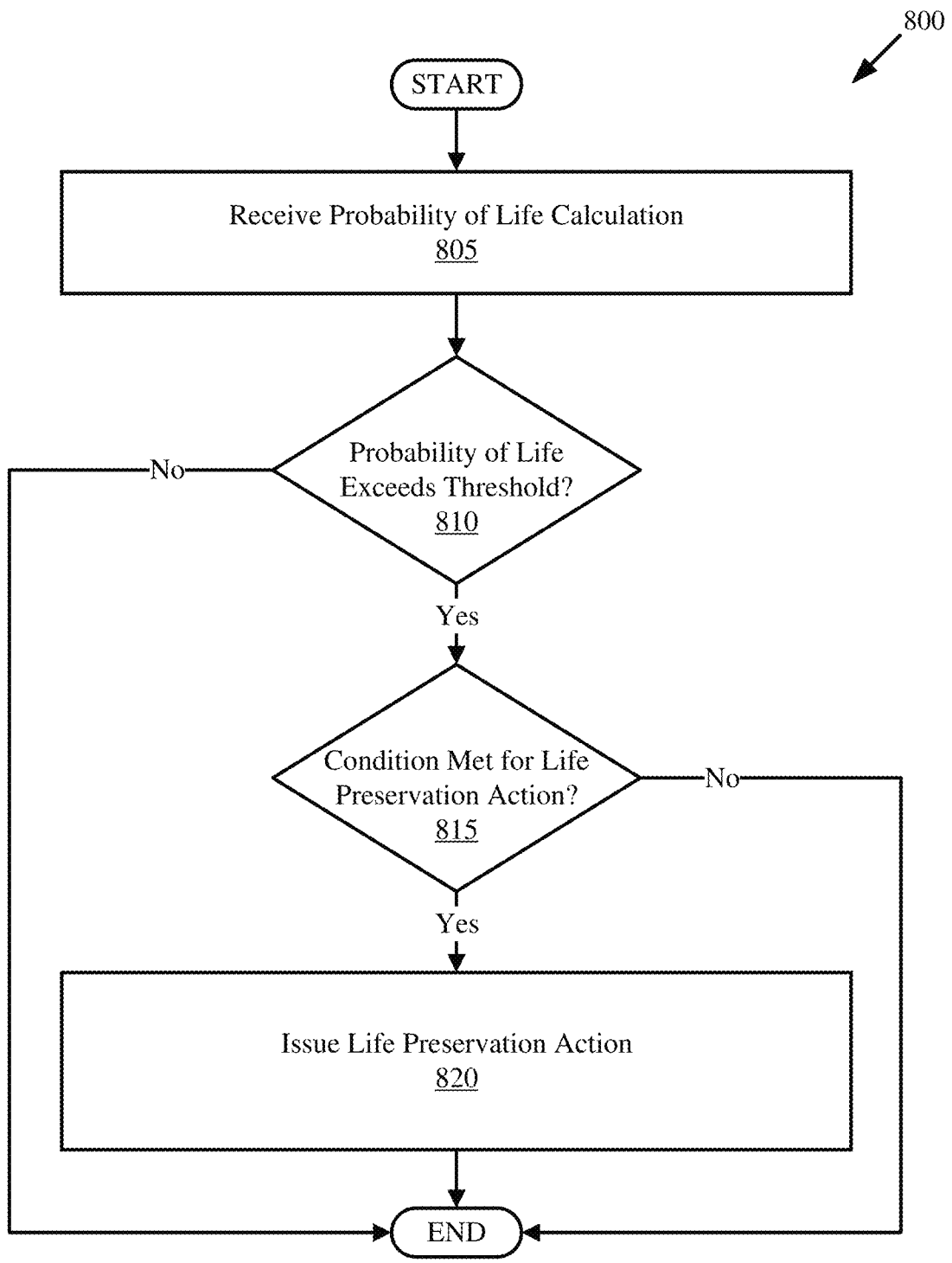
FIG. 8 is a flow-diagram depicting an example method for issuing life preservation actions based on life probability calculations, in accordance with embodiments of the present disclosure.

Referring now to FIG. 8, shown is an example method 800 for issuing life preservation actions based on received probability of life calculations, in accordance with embodiments of the present disclosure.

Method 800 initiates at operation 805, where a probability of life calculation is received. The probability of life calculation can be any probability of life calculation calculated throughout method 600. For example, probability of life calculations can include those calculated at operations 645, 650, and 665 of FIG. 6B. In embodiments, the probability of life calculations can be received in response to a predetermined condition, for example, a vehicular stage transition (e.g., stage transitions described in FIG. 7), a user request, a vehicular state change (e.g., a door opening), or another condition.

A determination is then made whether the probability of life exceeds a threshold. This is illustrated at operation 810. The threshold can be any suitable value and can be defined in any suitable manner. For example, the threshold can be 25%, 50%, 75%, etc. A lower threshold value can indicate that the system is more cautious (e.g., issue life preservation actions when the probability of life is relatively lower). In some embodiments, the threshold can be user defined. In some embodiments, the threshold can be determined using machine learning techniques.

If the probability of life exceeds the threshold, then a determination is made whether a condition is met for a life preservation action. This is illustrated at operation 815. In some embodiments, if the probability of life exceeds the threshold, a life preservation action is always issued. In some embodiments, however, a life preservation action is only issued if a particular condition is met. For example, a life preservation action may only be issued if the vehicle is in a particular vehicle stage, if the vehicle is at a particular temperature, if there is no weight in the driver's seat (e.g., as collected by a weight sensor), if the windows and doors are closed, if a user's device is a predetermined distance from the vehicle (e.g., based on global positioning system (GPS) data, etc. Conditions which can be used to determine whether to issue a life preservation action can include vehicular sensor values (e.g., as compared to threshold values), vehicular stages, user device data (e.g., GPS or social media data), and others.

If a determination is made that a condition is met for a life preservation action, then the life preservation action is issued. This is illustrated at operation 820. Life preservation actions can include issuing alerts (e.g., notifying devices 105, calling a user, calling a monitoring station, etc.) and activating vehicle features (e.g., activating a vehicle alarm, automatically opening a door, activating an air conditioning system, automatically opening a window, automatically unlocking a door, etc.). Such actions can prevent or mitigate danger caused by rising temperatures within the vehicle. Upon issuing a life preservation action, method 800 ends.

The aforementioned operations can be completed in any order and are not limited to those described. Additionally, some, all, or none of the aforementioned operations can be completed, while still remaining within the spirit and scope of the present disclosure. For example, in some embodiments, operation 815 may not be completed, as the life preservation action may automatically be issued based on the probability of life exceeding a threshold.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
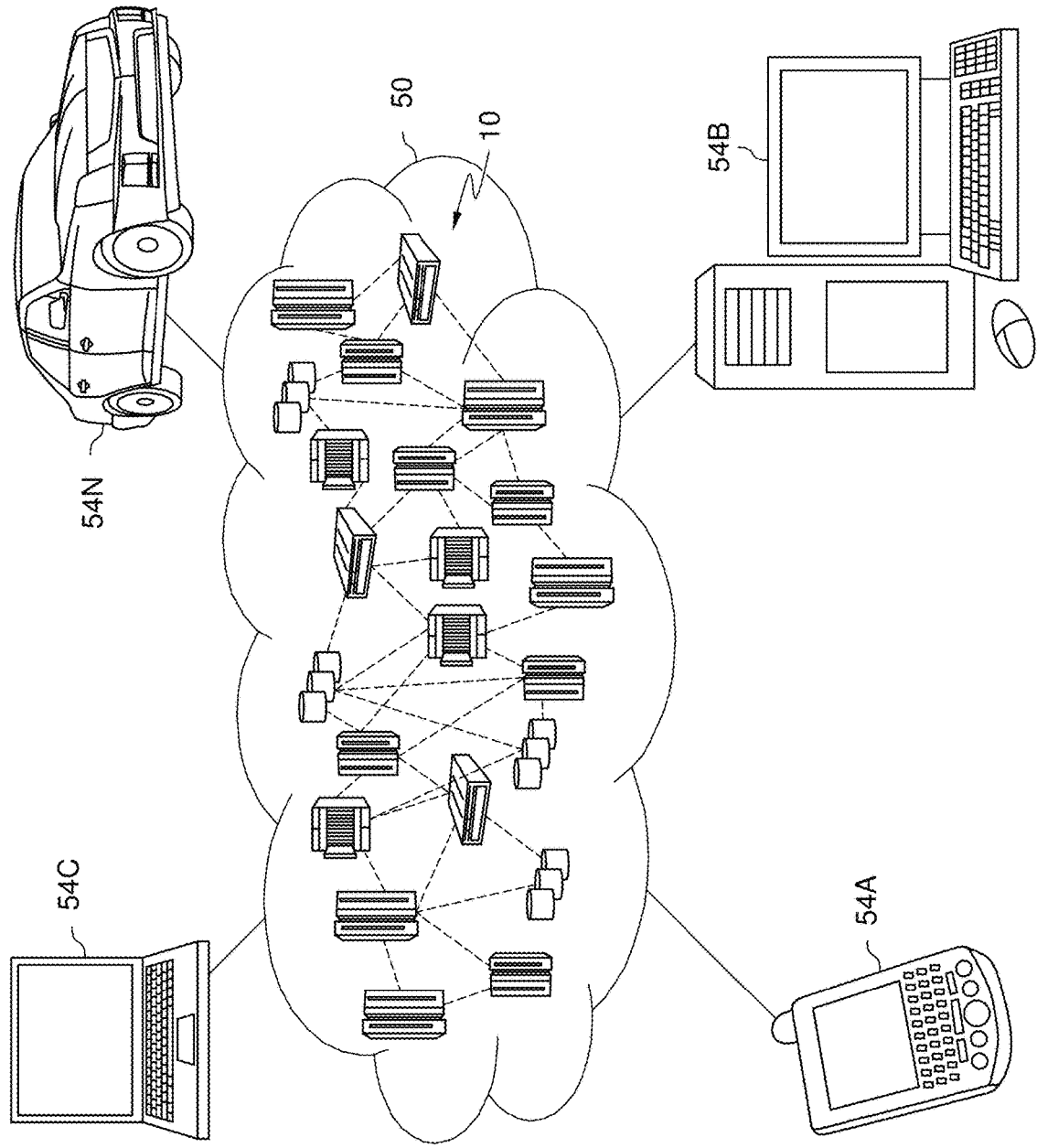
FIG. 9 is a diagram illustrating a cloud computing environment, in accordance with embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
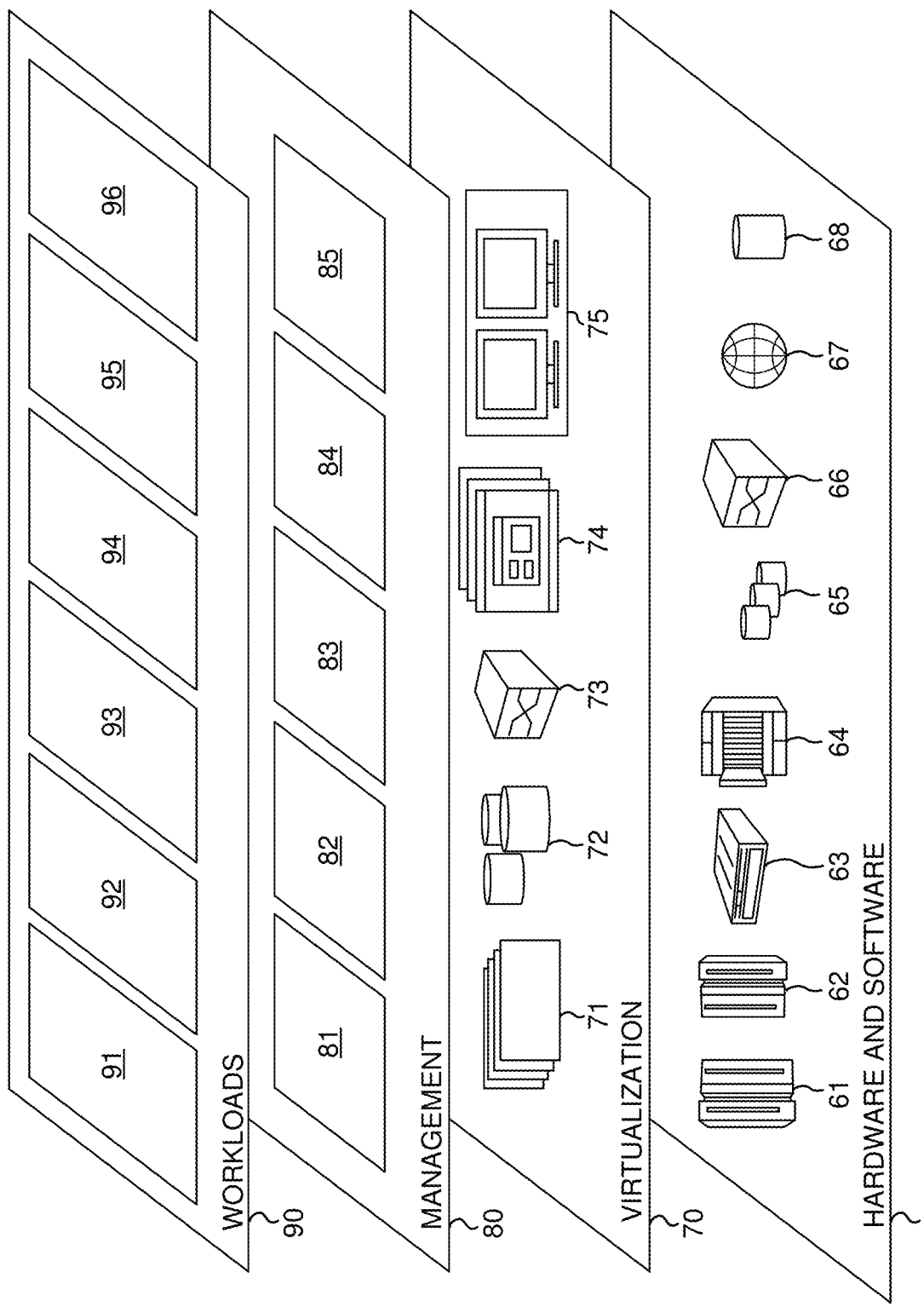
FIG. 10 is a block diagram illustrating abstraction model layers, in accordance with embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle life detection 96.

Figure 11:
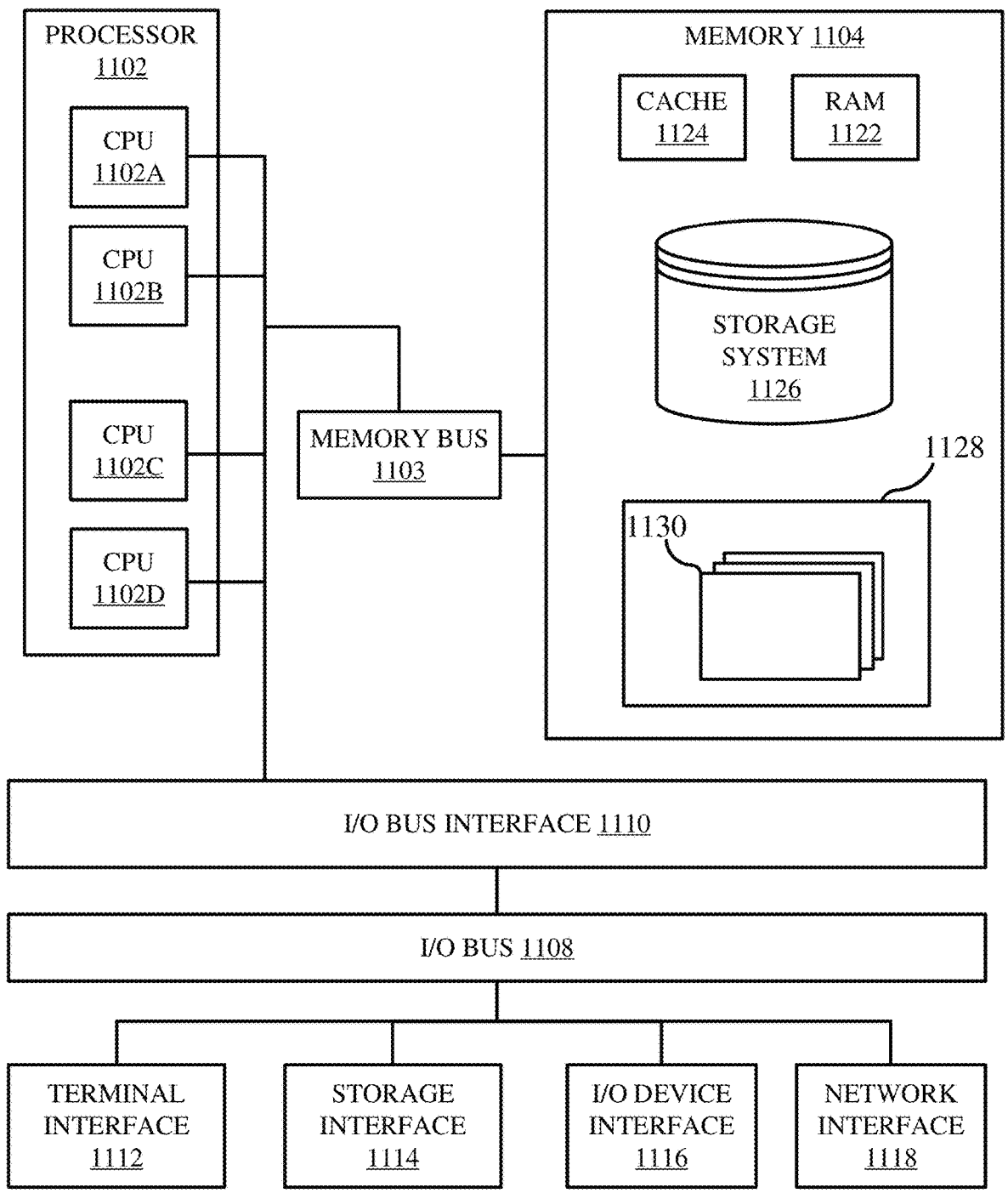
FIG. 11 is a high-level block diagram illustrating an example computer system that can be used in implementing one or more of the methods, tools, modules, and any related functions described herein, in accordance with embodiments of the present disclosure.

Referring now to FIG. 11, shown is a high-level block diagram of an example computer system 1101 that may possibly be utilized in various devices discussed herein (e.g., devices 105 and vehicle 135) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102 (also referred to as processors herein), a memory 1104, a terminal interface 1112, a storage interface 1114, an I/O (Input/Output) device interface 1116, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache.

Memory 1104 may include computer system readable media in the form of volatile memory, such as random-access memory (RAM) 1122 or cache memory 1124. Computer system 1101 may further include other removable/non-removable, volatile/non-volatile computer system storage media. By way of example only, storage system 1126 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

Although the memory bus 1103 is shown in FIG. 11 as a single bus structure providing a direct communication path among the CPUs 1102, the memory 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single respective units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 11 is intended to depict the representative major components of an exemplary computer system 1101. In some embodiments, however, individual components may have greater or lesser complexity than as represented in FIG. 11, components other than or in addition to those shown in FIG. 11 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications within the spirit and scope of the disclosure.

A non-limiting list of examples are provided hereinafter to demonstrate some aspects of the present disclosure. Example 1 is a computer-implemented method. The method includes collecting, during a first vehicle stage, sensor data from a first set of sensors associated with a first seat within a vehicle; and aggregating outputs of each sensor of the first set of sensors associated with the first seat to calculate a probability of life within the first seat during the first vehicle stage.

Example 2 includes the method of example 1, including or excluding optional features. In this example, additional sensor data is collected, during the first vehicle stage, from each of a plurality of sets of sensors, each set associated with each of a plurality of respective seats within the vehicle, wherein outputs of each sensor of each respective set of sensors are aggregated to calculate a probability of life for each seat within the vehicle during the first vehicle stage.

Example 3 includes the method of example 2, including or excluding optional features. In this example, the probabilities of life for each seat are aggregated to calculate a probability of life for the entire vehicle during the first vehicle stage.

Example 4 includes the method of example 3, including or excluding optional features. In this example, the method further comprises calculating a probability of life throughout at least two stages of the vehicle by aggregating the probability of life for the entire vehicle during the first vehicle stage with a probability of life for the entire vehicle during at least one additional vehicle stage.

Example 5 includes the method of any one of examples 1 to 4, including or excluding optional features. In this example, the output of each sensor is weighted based on at least the output of another sensor and based on the vehicle being in the first vehicle stage.

Example 6 includes the method of any of examples 1 to 5, including or excluding optional features. In this example, the method further comprises collecting feedback regarding whether life is actually present within the first seat of the vehicle during the first vehicle stage; comparing the feedback to the probability of life within the first seat during the first vehicle stage; and adjusting a weight of at least one sensor output used to calculate the probability of life within the first seat during the first vehicle stage.

Example 7 includes the method of any of examples 1 to 6, including or excluding optional features. In this example, at least one sensor of the set of sensors associated with the first seat is vehicle encompassing.

Example 8 includes the method of any of examples 1 to 7, including or excluding optional features. In this example, the method further comprises comparing the probability of life within the first seat to a threshold; and issuing a life preservation action in response to the probability of life within the first seat exceeding the threshold.

Example 9 includes the method of example 8, including or excluding optional features. In this example, prior to issuing the life preservation action, a determination is made whether a condition is met for issuing the life preservation action.

Example 10 is a system. The system includes a memory storing program instructions and a processor, wherein the processor is configured to execute the program instructions to perform a method according to any one of examples 1 to 9.

Example 11 is a computer program product. The computer program product comprises a computer readable storage medium having program instructions embodied therewith, the program instructions executable by a processor to cause the processor to perform a method according to any one of examples 1 to 9.

Example 12 is a method. The method includes collecting, during a first vehicle stage, sensor data from each of a plurality of sets of sensors, each set associated with each of a plurality of respective seats within the vehicle; aggregating outputs of each sensor of each respective set of sensors to calculate a probability of life for each seat within the vehicle during the first vehicle stage; aggregating the probabilities of life for each seat to calculate a probability of life for the entire vehicle during the first vehicle stage; and calculating a probability of life throughout at least two stages of the vehicle by aggregating the probability of life for the entire vehicle during the first vehicle stage with a probability of life for the entire vehicle during at least one additional vehicle stage.

Example 13 includes the method of example 12, including or excluding optional features. In this example, the method includes comparing the probability of life throughout at least two stages of the vehicle to a threshold; and issuing a life preservation action in response to the probability of life throughout at least two stages of the vehicle exceeding the threshold.

Example 14 is a computer program product. The computer program product comprises a computer readable storage medium having program instructions embodied therewith, the program instructions executable by a processor to cause the processor to perform a method according to example 12.

What is claimed is:

1. A method comprising:
   collecting, during a first vehicle stage, sensor data from a first set of sensors associated with a first seat within a vehicle, the first vehicle stage designating a first vehicle ignition state and gear state;
   aggregating outputs of each sensor of the first set of sensors associated with the first seat to calculate a probability of life within the first seat during the first vehicle stage;
   comparing the probability of life within the first seat to a threshold;
   issuing a life preservation action in response to the probability of life within the first seat exceeding the threshold;
   collecting feedback regarding whether life is present within the first seat of the vehicle during the first vehicle stage;
   comparing the feedback to the probability of life within the first seat during the first vehicle stage; and
   adjusting, based on the comparison between the feedback and the probability of life, a weight of at least one sensor output used to calculate the probability of life within the first seat during the first vehicle stage.

2. The method of claim 1, wherein additional sensor data is collected, during the first vehicle stage, from each of a plurality of sets of sensors, each set associated with each of a plurality of respective seats within the vehicle, wherein outputs of each sensor of each respective set of sensors are aggregated to calculate a probability of life for each seat within the vehicle during the first vehicle stage.

3. The method of claim 2, wherein the probabilities of life for each seat are aggregated to calculate a probability of life for the entire vehicle during the first vehicle stage.

4. The method of claim 3, further comprising:
calculating a probability of life throughout at least two stages of the vehicle by aggregating the probability of life for the entire vehicle during the first vehicle stage with a probability of life for the entire vehicle during at least one additional vehicle stage, the at least one additional vehicle stage designating a second vehicle ignition state and gear state.

5. The method of claim 1, wherein the output of each sensor is weighted based on at least the output of another sensor.

6. The method of claim 1, wherein prior to issuing the life preservation action, a determination is made whether a condition is met for issuing the life preservation action.

7. A system comprising:
a memory storing program instructions; and
a processor, wherein the processor is configured to execute the program instructions to perform a method comprising:
collecting, during a first vehicle stage, sensor data from a first set of sensors associated with a first seat within a vehicle, the first vehicle stage designating a first vehicle ignition state and gear state;
aggregating outputs of each sensor of the first set of sensors associated with the first seat to calculate a probability of life within the first seat during the first vehicle stage;
comparing the probability of life within the first seat to a threshold;
issuing a life preservation action in response to the probability of life within the first seat exceeding the threshold;
collecting feedback regarding whether life is present within the first seat of the vehicle during the first vehicle stage;
comparing the feedback to the probability of life within the first seat during the first vehicle stage; and
adjusting, based on the comparison between the feedback and the probability of life, a weight of at least one sensor output used to calculate the probability of life within the first seat during the first vehicle stage.

8. The system of claim 7, wherein additional sensor data is collected, during the first vehicle stage, from each of a plurality of sets of sensors, each set associated with each of a plurality of respective seats within the vehicle, wherein outputs of each sensor of each respective set of sensors are aggregated to calculate a probability of life for each seat within the vehicle during the first vehicle stage.

9. The system of claim 8, wherein the probabilities of life for each seat are aggregated to calculate a probability of life for the entire vehicle during the first vehicle stage.

10. The system of claim 9, wherein the memory stores additional program instructions, and wherein the processor is configured to execute the additional program instructions to perform the method further comprising:
calculating a probability of life throughout at least two stages of the vehicle by aggregating the probability of life for the entire vehicle during the first vehicle stage with a probability of life for the entire vehicle during at least one additional vehicle stage, the at least one additional vehicle stage designating a second vehicle ignition state and gear state.

11. The system of claim 7, wherein the output of each sensor is weighted based on at least the output of another sensor.

12. The system of claim 7, wherein prior to issuing the life preservation action, a determination is made whether a condition is met for issuing the life preservation action.

13. A computer program product comprising a computer readable storage medium having program instructions embodied therewith, the program instructions executable by a processor to cause the processor to perform a method comprising:
collecting, during a first vehicle stage, sensor data from a first set of sensors associated with a first seat within a vehicle, the first vehicle stage designating a first vehicle ignition state and gear state;
aggregating outputs of each sensor of the first set of sensors associated with the first seat to calculate a probability of life within the first seat during the first vehicle stage;
comparing the probability of life within the first seat to a threshold; [[and]]
issuing a life preservation action in response to the probability of life within the first seat exceeding the threshold;
collecting feedback regarding whether life is present within the first seat of the vehicle during the first vehicle stage;
comparing the feedback to the probability of life within the first seat during the first vehicle stage; and
adjusting, based on the comparison between the feedback and the probability of life, a weight of at least one sensor output used to calculate the probability of life within the first seat during the first vehicle stage.

14. The computer program product of claim 13, wherein additional sensor data is collected, during the first vehicle stage, from each of a plurality of sets of sensors, each set associated with each of a plurality of respective seats within the vehicle, wherein outputs of each sensor of each respective set of sensors are aggregated to calculate a probability of life for each seat within the vehicle during the first vehicle stage.

15. The computer program product of claim 14, wherein the probabilities of life for each seat are aggregated to calculate a probability of life for the entire vehicle during the first vehicle stage.

16. The computer program product of claim 15, wherein the computer readable storage medium has additional program instructions embodied therewith, the additional program instructions executable by the processor to cause the processor to perform the method further comprising:
calculating a probability of life throughout at least two stages of the vehicle by aggregating the probability of life for the entire vehicle during the first vehicle stage with a probability of life for the entire vehicle during at least one additional vehicle stage, the at least one additional vehicle stage designating a second vehicle ignition state and gear state.

17. A method comprising:
collecting, during a first vehicle stage, sensor data from each of a plurality of sets of sensors, each set associated with each of a plurality of respective seats within a vehicle, the first vehicle stage designating a first vehicle ignition state and gear state;

aggregating outputs of each sensor of each respective set of sensors to calculate a probability of life for each seat within the vehicle during the first vehicle stage;

aggregating the probabilities of life for each seat to calculate a probability of life for the entire vehicle during the first vehicle stage;

calculating a probability of life throughout at least two stages of the vehicle by aggregating the probability of life for the entire vehicle during the first vehicle stage with a probability of life for the entire vehicle during at least one additional vehicle stage, the at least one additional vehicle stage designating a second vehicle ignition state and gear state;

comparing the probability of life throughout at least two stages of the vehicle to a threshold; and issuing a life preservation action in response to the probability of life throughout at least two stages of the vehicle exceeding the threshold.

18. A computer program product comprising a computer readable storage medium having program instructions embodied therewith, the program instructions executable by a processor to cause the processor to perform a method comprising:

collecting, during a first vehicle stage, sensor data from each of a plurality of sets of sensors, each set associated with each of a plurality of respective seats within a vehicle, the first vehicle stage designating a first vehicle ignition state and gear state;

aggregating outputs of each sensor of each respective set of sensors to calculate a probability of life for each seat within the vehicle during the first vehicle stage;

aggregating the probabilities of life for each seat to calculate a probability of life for the entire vehicle during the first vehicle stage;

calculating a probability of life throughout at least two stages of the vehicle by aggregating the probability of life for the entire vehicle during the first vehicle stage with a probability of life for the entire vehicle during at least one additional vehicle stage, the at least one additional vehicle stage designating a second vehicle ignition state and gear state;

comparing the probability of life throughout at least two stages of the vehicle to a threshold; and issuing a life preservation action in response to the probability of life throughout at least two stages of the vehicle exceeding the threshold.

19. The method of claim 6, wherein the determination that the condition for issuing the life preservation action is met includes detecting no weight, by a weight sensor, within a driver's seat of the vehicle.

20. The method of claim 6, wherein the determination that the condition for issuing the life preservation action is met includes determining that the windows and doors of the vehicle are closed.

21. The method of claim 6, wherein the determination that the condition for issuing the life preservation action is met includes determining, based on global positioning system (GPS) data, that a user device of a user associated with the vehicle is a predetermined distance away from the vehicle.

22. The method of claim 1, wherein the life preservation action includes activating at least one vehicle feature associated with the vehicle.

23. The method of claim 22, wherein activating at least one vehicle feature associated with the vehicle includes activating an air conditioning system of the vehicle.

* * * * *